(12) United States Patent
Neill et al.

(10) Patent No.: US 9,100,295 B2
(45) Date of Patent: *Aug. 4, 2015

(54) VIRTUAL SERVICE DELIVERY PLATFORM

(71) Applicant: CSC Holdings, LLC, Bethpage, NY (US)

(72) Inventors: Richard Neill, Syosset, NY (US); Pradip Khisti, Hicksville, NY (US)

(73) Assignee: CSC Holdings, LLC, Bethpage, NY (US)

( * ) Notice: Subject to any disclaimer, the term of this patent is extended or adjusted under 35 U.S.C. 154(b) by 49 days.

This patent is subject to a terminal disclaimer.

(21) Appl. No.: 14/074,438

(22) Filed: Nov. 7, 2013

(65) Prior Publication Data

US 2014/0068031 A1 Mar. 6, 2014

Related U.S. Application Data

(63) Continuation of application No. 13/216,891, filed on Aug. 24, 2011, now Pat. No. 8,583,767.

(51) Int. Cl.
G06F 15/177 (2006.01)
H04L 12/24 (2006.01)
G06F 9/50 (2006.01)

(52) U.S. Cl.
CPC .......... *H04L 41/0803* (2013.01); *G06F 9/5055* (2013.01)

(58) Field of Classification Search
USPC ......................................... 709/220, 223, 217
See application file for complete search history.

(56) References Cited

U.S. PATENT DOCUMENTS

| 5,862,346 | A | 1/1999 | Kley et al. |
|---|---|---|---|
| 6,052,720 | A | 4/2000 | Traversat et al. |
| 6,530,082 | B1 | 3/2003 | Del Sesto et al. |
| 6,983,478 | B1 | 1/2006 | Grauch et al. |
| 8,583,767 | B2 * | 11/2013 | Neill et al. ............. 709/220 |
| 2003/0229892 | A1 | 12/2003 | Sardera |
| 2006/0236323 | A1 | 10/2006 | Neill et al. |
| 2007/0016695 | A1 | 1/2007 | Rabbers et al. |
| 2009/0187413 | A1 | 7/2009 | Abels et al. |
| 2010/0106685 | A1 | 4/2010 | Ott et al. |
| 2010/0162294 | A1 | 6/2010 | Yin et al. |
| 2011/0153806 | A1 | 6/2011 | Bagasra |

* cited by examiner

*Primary Examiner* — Philip B Tran
(74) *Attorney, Agent, or Firm* — Sterne, Kessler, Goldstein & Fox PLLC

(57) ABSTRACT

A system, computer-implemented method and a computer-readable medium for accessing content on a plurality of computing devices from a plurality of independent frameworks. The system includes a virtual backend service (VBS) platform. A plurality of independent frameworks hosted on the VBS platform, where each independent framework is configured to provide access to an independent set of applications that provide a service over a network. The system also includes a configuration module for configuring each computing device in the plurality of computing devices to access the set of applications particular to the independent framework, wherein the configuring dynamically switches access of each computing device between the independent frameworks, and access the service from each framework by the configured computing device.

20 Claims, 9 Drawing Sheets

VIRTUAL SERVICE DELIVERY PLATFORM

CROSS REFERENCE TO RELATED APPLICATIONS

This application is a continuation of U.S. patent application Ser. No. 13/216,891, filed on Aug. 24, 2011, assigned U.S. Pat. No. 8,583,767, which is incorporated by reference in its entirety.

BACKGROUND OF THE INVENTION

1. Field of the Invention

Embodiments relate generally to a virtual service delivery platform and specifically to using the virtual service delivery system to distribute applications to multiple computing devices.

2. Background Art

In a conventional distributed system environment, a static set of clients is mapped to a server or a set of servers. When an application that executes on a server requires upgrading, the upgrade is performed throughout the mapped server and affects all clients that are mapped to the particular server. Similarly, when an application that executes on a set of clients requires an upgrade, the upgraded application is distributed to entire set of clients. As a result, a limited deployment of an application to a server that does not affect all clients or to some clients in the set of clients is not possible.

Additionally, because the clients in the set of clients are mapped to a particular server, different clients within the set cannot receive services and content based on their specific needs, cannot receive an application upgrade unless the upgrade affects all clients, and cannot be configured for quality assurance and testing prior to an application upgrade.

Therefore, what is needed is a distributed system that maps a configurable sot of clients to configurable frameworks on the servers and allows the a system environment where applications are tested, deployed, upgraded and provide services tailored to a configurable set of clients.

SUMMARY OF THE INVENTION

A system, computer-implemented method and a computer-readable medium for accessing content on a plurality of computing devices from a plurality of independent frameworks. The system includes a virtual backend service (VBS) platform. A plurality of independent frameworks hosted on the VBS platform, where each independent framework is configured to provide access to an independent set of applications that provide a service over a network. The system also includes a configuration module for configuring each computing device in the plurality of computing devices to access the set of applications particular to the independent framework, wherein the configuring dynamically switches access of each computing device between the independent frameworks, and access the service from each framework by the configured computing device.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The accompanying drawings are included to provide further understanding, are incorporated in and constitute a part of this specification, and illustrate embodiments that, together with the description, serve to explain the principles of the invention. In the drawings.

The present embodiments will now be described with reference to the accompanying drawings. In the drawings, like reference numbers may indicate identical or functionally similar elements.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope of the invention and additional fields in which the invention would be of significant utility.

Figure 1:
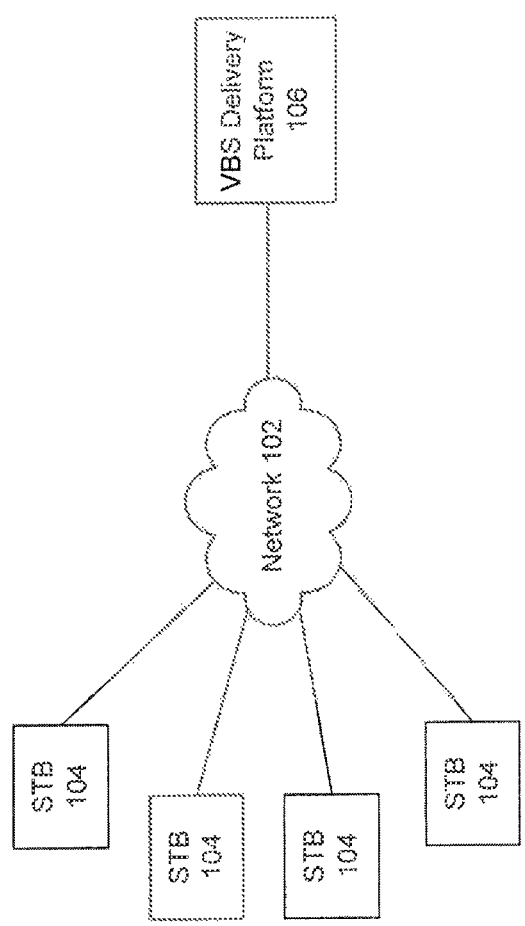
FIG. 1 is a block diagram of a distributed system where the embodiments of the invention may be implemented.

FIG. 1 is a block diagram of a distributed system 100 where the embodiments of the invention may be implemented. Unlike conventional distributed systems, distributed system 100 configures, provides access to and deploys multiple applications to configurable sets of remote clients and to configurable frameworks within the servers. Distributed system 100 also decouples backend server application releases and upgrades from remote clients, and vice versa. Distributed system 100 further deploys application releases and upgrades to the configurable sets of clients in parallel.

Distributed system 100 enables a server to target a configurable set of clients with particular content based on the credentials of each client. Example credentials include, without limitation, a type of a client, level of service or configurable business needs. Example client types may be a make or model of a client, an operating system that executes on a client, or a version of software that executes on a client, or the serial number of a client. Example level of service may be a service level that a user who controls the client buys from a server provider, such as premium media content channels, premium bandwidth, server provider specials, etc.

Distributed system 100 allows for a distribution of applications and/or content to clients based on other factors that include, without limitation, a geographical location, such as a zip code, a client population, etc.

Distributed system 100 also provides for a flexible approach for testing applications on a configurable set of clients. For example, distributed system 100 allows for a configurable set of clients to receive content from the tested application for quality assurance (QA) and testing purposes. A person skilled in the art will appreciate that quality assurance and testing of an application allows for bug fixes prior to a large-scale release.

Exemplary distributed system 100 includes a network 102, multiple clients and servers. For purposes of clarity, the embodiment of the distributed system 100 described herein, includes a set-top-box (STB) 104 as a client and a virtual backend system (VBS) 106 that includes one or more servers. However, a person skilled in the art will appreciate that a client may be any computing device or application executing on a computing device that accesses a server for applications or services. A person skilled in the art will also appreciate that a server may be any host computing device, an application executing on a computing device or a hardware/software system that distributes applications or services to one or more clients.

Network 102 may be any network or combination of networks that can carry data communication. Such a network 102 may include, but is not limited to, wired or wireless local area network, metropolitan area network, and/or wide area network such as the Internet. Network 102 can support protocols and technologies including, but not limited to, World Wide Web protocols and/or services. Intermediate web servers, gateways, or other servers may be provided between components of the system shown in FIG. 1 depending upon a particular application or environment.

Network 102 also includes a local area network. Local network provides wired and wireless connectivity with various networks and network-enabled devices, including computers, the Internet, telephones, etc. Additionally, network 102 includes networks such as analog telephones, X10 and other home automation communications, and the like.

STB 104 is a client that receives media content from a server and displays the media content to a user using, for example, a television screen, a personal computer, a computer tablet, a mobile or another computing device. In distributed system 100, STB 104 communicates with VBS 106 through network 102. Exemplary STB 104 can include, without limitation, an Internet Protocol (IP)-based (i.e., IPTV) STB. However, it will be apparent to those skilled in the art that other STBs can be used in embodiments described herein.

Media content that STB 104 receives may be information or experiences that provide value to a user, in specific contexts. Example media content may include video content, video-on-demand, streaming media content, interactive media and GUI widgets included in software applications, to name only a few.

VBS 106 is a backend delivery system for assembling and distributing applications 206 to STBs 104 over network 102. As described above, VBS 106 includes multiple servers that provide content, such as media content, streaming video content, and services to STBs 104. VBS 106 also stores applications ready for distribution to STBs 104, distributes new applications and application upgrades to a configurable set of STBs 104, and performs upgrades on servers within VBS 106.

Figure 2:
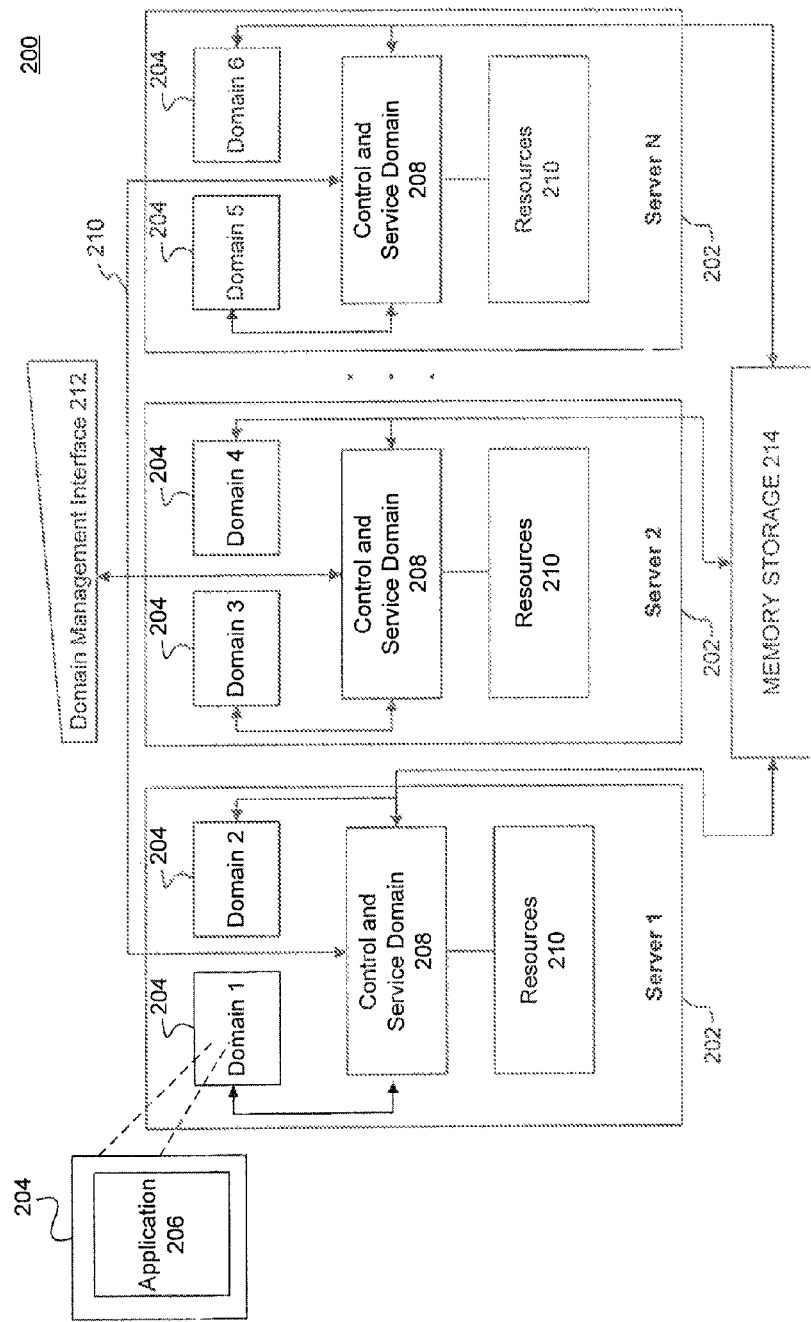
FIG. 2 is a block diagram of exemplary virtual backend network.

FIG. 2 is a block diagram 200 of an exemplary embodiment of a virtual backend system, such as VBS 106. VBS 106 includes multiple servers 202, a domain management interface 212 and a memory storage 214.

Server is a computing device described herein that includes one or more domains 204, control and service domain 208 and resources 210. Each domain 204 is a logical set of resources 210 that are executing on server 202. Domain 204 may be executing its own operating system, including but not limited to a Solaris, Linux, Windows or AIX. Resources 210 on each server 202 determine the number of domains 204 that can co-exist on each server 202.

Each domain 204 may include one or more applications 206. Example application 206 may include, without limitation, a software application configured to process data or content to and from STB 104, a test application configured to execute on VBS 106, an application that is a component of the VBS 106, such as, but not limited to a data junction application, a messaging application, or a data collection application, described in detail in FIG. 4. In an embodiment, application 206 may also be a software application that executes on STB 104. To execute application 206, domain 204 accesses resources 210 on server 202.

In an embodiment, each domain 204 is associated with a framework. Each framework within VBS 106 provides services and content to a configurable set of STBs 104. In an embodiment, different frameworks within VBS 106 may include domains 204 that execute different versions of the same application 206, in parallel. This allows the system administrator to configure a framework environment, such as a testing environment, that includes a configurable set of STBs 104 and a framework that executes a particular application 206.

Control and service domain 208 manages access to resources 210 for each domain 204 on server 202. Control and service domain 208 may manage resources 210 on server 202 or on multiple servers 202. For example control and service domain 208 ensures that the domains 204 on each server 202 have enough resources 210 to provide services to STBs 104. Example control and service domain 208 may be an application software such as VMWare or Xen/Citrix, or a Solaris Resource Manager.

Resources 210 may be hardware or software resources that are utilized by domains 204 on server 202. Example hardware resources such as a processor, memory, disk drive, etc., are described in detail in FIG. 8. Example software resources are software applications utilized by domains 204 to execute applications 206.

Domain management interface 212 allows a system administrator to configure domains 204 and frameworks on servers 202 within VBS 106. Domain management interface 212 may be a proprietary software application or may be provided by a control and service domain 208. For example, domain management interface 212 uses control and service domain 208 to configure applications 206 for each domain 204. Additionally, domain management interface 212 load-balances domains 204 among multiple servers 202.

Figure 3:
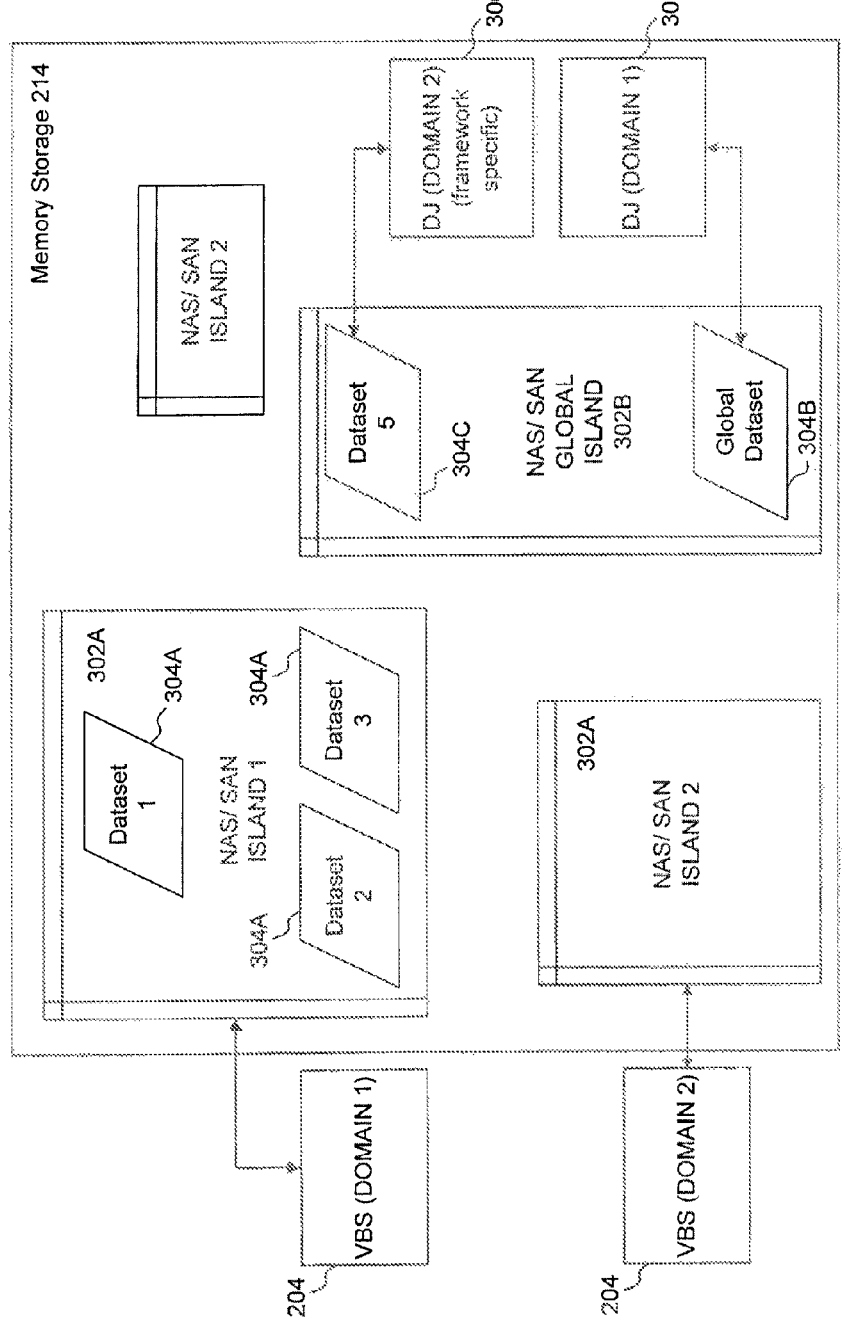
FIG. 3 is a block diagram of exemplary virtual memory storage.

FIG. 3 is an exemplary embodiment 300 of memory storage, such as memory storage 214. Memory storage 214 is general storage space that stores data associated with server 202, VBS 106 and data that may be distributed to STBs 104. Memory storage 214 stores transitory data that is being prepared for distribution. Example of memory storage 214 is SAN/NAS disk arrays, such as, but not limited to HP EVA4400 dual-controller array, with EVA M6412A (450 GB FC) hard drives, an HP M6412A fiber channel drive enclosure, and HP 8/24 base (16) full fabric ports enabled SAN switch.

Memory storage 214 includes multiple memory islands (or simply "islands") 302. Each island 302 stores data that is marked for distribution. Typically, island 302 stores data that is transitory and is not being updated on island 302. Island 302 that stores a local dataset 304A is a local island, such as an island 302A. Island 302 that stores global dataset 304B is a global island, such as an island 302B.

Each island 302 includes datasets 304. Each dataset 304 is a collection of information necessary to itemize resources required for domain 204 to function properly. Datasets 304 may include one or more files associated with data or application 206 that is configured for distribution to STBs 104. Dataset 304 may be a local dataset, such as local dataset 304A. Local dataset 304A includes data generated by a particular domain 204 for a particular framework. Local datasets 304A include data that does not intersect with data from other domains 204.

A global dataset is dataset 304B. Global dataset 304B may include global data that is accessed by multiple frameworks and may include data from multiple domains 204. In an embodiment, global dataset 304B may be accessed by a global domain, such as global domains 306. Global domain 306 executes applications that interact with multiple frameworks.

In an embodiment, dataset 304 may also include a hybrid dataset, such as dataset 304C. Hybrid dataset 304C includes global data that may be accessed by a particular framework or a set of frameworks. Data in hybrid data set 304C may intersect with a data from a set of frameworks. Also, data in hybrid dataset 304 C may be accessed by global domain 306 that is associated with a particular framework or a set of frameworks.

Each island 302 stores data for a framework. A framework includes applications 206 that provide data and services to a configurable set of STBs 104. Each framework includes domain 204 that execute a particular version of application 206. For example, domain 204 in one framework may execute version A of application 206, and domain 204 in another framework may execute version B of the same application 206.

Frameworks are configured by a system administrator such that applications 206 included in the framework are compatible with other components in the framework, as well as components on STBs 104. When application 206 is upgraded within the framework or distributed to STBs 104, VBS 106 performs a compatibility check that determines whether application 206 is compatible with the remaining components in the framework. For example, a VBS 106 system administrator may use domain management interface 212 to determine the compatibility of applications 206 to the framework and to STBs 104.

In an embodiment, each framework restricts read and write data access to island 302. For example, applications 206 that belong to the framework can read data from island 302 and write data to island 302 associated with the framework.

The separation of VBS 106 into multiple frameworks allows a system administrator to configure and reconfigure STBs 104 into different sets, where each set is associated with a particular framework. As a result, a system administrator may set up testing environment to test an upgrade of application 206 on either a framework within VBS 106 or on a set of STBs 104. The system administrator may also initiate a deployment of application 206 to a set of STBs 104 that is configured according to a particular tip code, state, region, STB serial number, type, user profile, etc.

Figure 4:
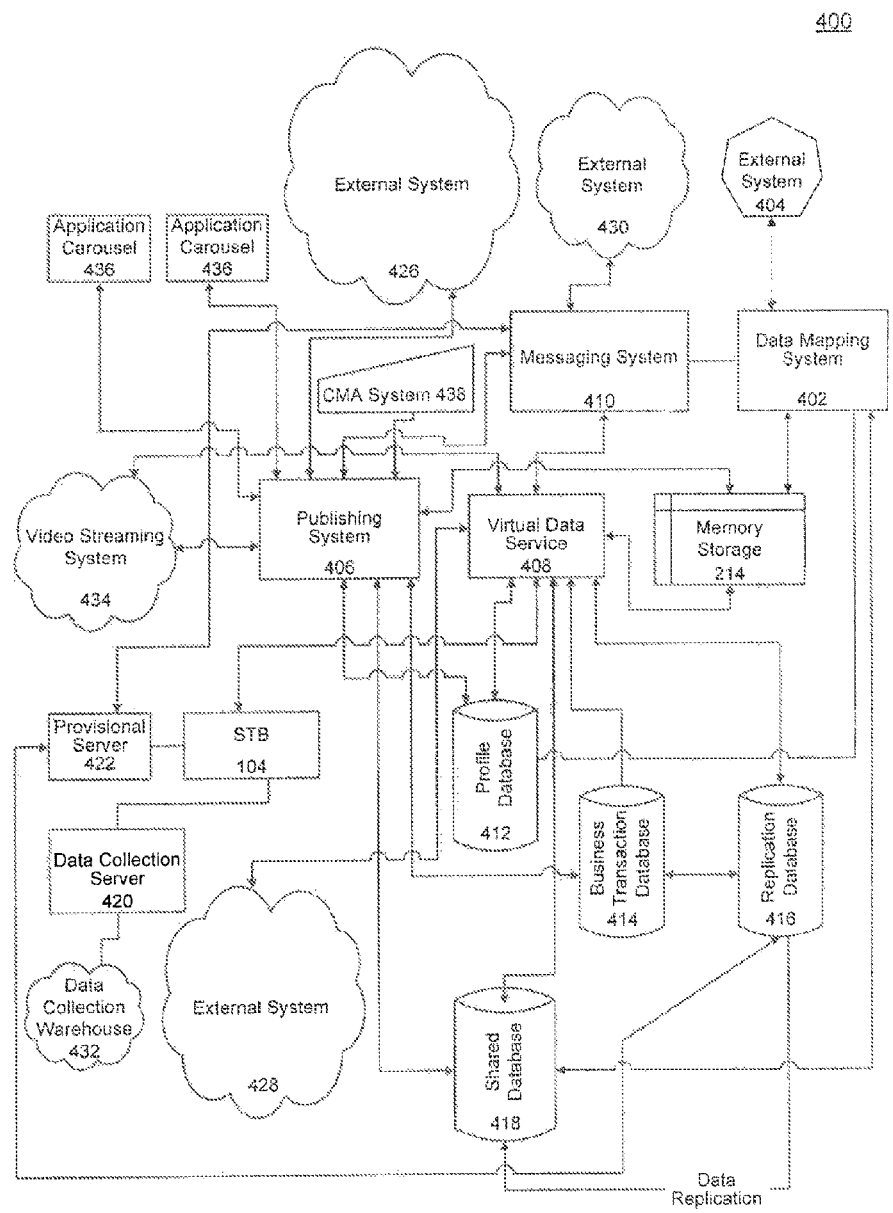
FIG. 4 is a block diagram of exemplary virtual backend architecture for a virtual backend system.

FIG. 4 is a block diagram 400 of a virtual backend architecture (VBA) 400 for a virtual backend system. For illustrative purposes, VBA 400 is configured to process media content, in an embodiment. However, a person skilled in the art will appreciate that VBA 400 may be configured to process other content, applications or data.

VBA 400 includes components such as a data mapping system 402, a publishing system 406, a virtual data service 408, a messaging system 410, a profile database 412, a memory storage 214, a business transaction database 414, a replication database 416, a shared database 418, data collection servers 420, and provisioning servers 422. A person skilled in the art will appreciate that virtual backend architecture 400 is given by way of example and not limitation, and that other architectures of virtual backend system 400 may be designed.

Components in VBA 400, described above, are one or more applications 206 that may be implemented in multiple domains 204, where each domain 204 executes a particular version of the component. Moreover, the components in domains 204 that are compatible with each other are combined into a framework. As described herein, each framework is independent of other frameworks and services a configurable set of STBs 104, provides a QA and testing environment and distributes applications 206 to STBs 104.

Data mapping system 402 is a component in VBA 400 that includes multiple applications 206 executing on multiple domains 204. In an embodiment, data mapping system 402 may be load balanced on multiple domains 204. A person skilled in the art will appreciate that load balancing distributes a workload across multiple servers 202, resources 210, etc. to achieve maximum utilization of the resources and avoid a system overload.

In an embodiment, data mapping system 402 may be included as part of a framework that services a configurable group of STBs 204. When data mapping system 402 services a configurable group of STBs 104, it is allocated local island 302A in memory storage 214. In another embodiment, data mapping system 402 may be configured to provide data to multiple frameworks, and be allocated global island 302B in memory storage 214.

Data mapping system 402 synchronizes and converts data from processed by frameworks executing in VBA 400 and systems external to VBA 400. For example, data mapping system 402 accepts data from external systems 404, messaging system 410, memory storage 214 and databases, such as profile database 412 and shared database 418. Data mapping system 402 may periodically request data from external systems 404 or send data to external systems 404.

Data mapping system 402 also converts data from one format to another. When data mapping system 402 receives data from external system 404, data mapping system 402 converts data into a format that is compliant with memory storage 214, profile database 412, shared database 418, or messaging system 410. Example data that data mapping system 402 receives and processes includes database assets, platform data sources, shortcut data, triggering schedules, advertisement banners, weather banners, service upgrade templates, etc.

Data mapping system 402 also reads and writes data from memory storage 214. Data mapping system 402 may read and write data from local datasets 304A, global datasets 304B, hybrid datasets 304C and to and from other components in VBA 400.

Publishing system 406 is a component in VBA 400 that also includes multiple applications 206 executing on multiple domains 204. Publishing system 406 generates data and assets for interfacing with STBs 104 or external systems 426. Example external systems 426 that receive assets from publishing system 406 may include, without limitation, UBR Range file download services, network DVR (such as "RS-DVR" or "N-DVR) streaming web services, media content services, and/or Tribune for EPG data.

Publishing system 406 also generates data and assets for experimental applications 206, such as applications 206 that are in testing or QA phase on a set of STBs 104 associated with a particular framework. Publishing system 406 may also generate a listing for each application 206. The listing includes server 202, a framework and domain 204 associated with each application 206. In an embodiment, the listing may be stored in a read-only dataset 304 in memory storage 214.

Publishing system 406 also subscribes and publishes messages to and from messaging system 410. In an embodiment, publishing system 406 may receive and process messages that include data from messaging system 410 in real-time. When publishing system 406 receives real-time data, publishing system 406 distributes the data to components within VBA 400. For example, when application 206 for publishing system 406 receives data from messaging system 410, application 206 stores the data in memory storage 214. The data in memory storage 214 may be stored in a dataset 304 associated with domain 204 that executes application 206.

A cron scheduler associated with publishing system 406 may distribute data in dataset 304 to multiple components within VBA 400. A person skilled in the art will appreciate that a cron scheduler is a computer-based scheduler in a computer operating system that executes at configurable intervals. Cron scheduler enables a system administrator to schedule jobs that include commands or shell scripts for performing specific tasks at periodic time intervals. For example, publishing system 406 may use the cron scheduler to distribute data in dataset 304 to profile database 412, business transaction database 414 and shared database 418.

Virtual data service (VDS) 408 is a component of VBA 400 that includes applications 206 that execute on multiple domains 204. Applications 206 included in VDS 408 provide services such as business and transaction services to other components in VBA 400 and STBs 104. In an embodiment, VDS 408 includes application 206 that acts as a profile manager. The profile manager interacts with profile database 412 and retrieves a profile of a user that receives content through STB 104. In another embodiment, VDS 408 also publishes and subscribes to messages from messaging system 410, and makes business decisions based on those messages.

In an embodiment, applications 206 within VDS 408 read and write data to business transaction database 414, replication database 416 and shared database 418.

In an embodiment, applications 206 within VDS 408 may be configured to process business transactions for a particular set of STBs 104.

In an embodiment, additionally, each application 206 within VDS 408 may read and write data into dataset 304 within memory storage 214.

VDS 408 also includes applications 206 that provide services to STBs 104. Example services provided to STBs 104 include web services and user interface services, where a user can initiate a media content transaction with VBS 106, an application upgrade or a user profile update.

VDS 408 also includes applications 206 that communicate and performs business transactions with external system 428. Example external systems 428 include Caller ID JMS systems, commerce platforms, Upsell Backend Services, RS-DVR Asset Locator Services, etc.

Messaging system 410 includes multiple message queues that send or receive messages to components within VBA 400 or external messaging systems 430. Messaging system 410 includes applications 206 that execute on multiple domains 204. For example, applications 206 executing on one domain 204 may include business logic for processing messages to and from profile database 412. Application 206 executing on another domain 204 may send and receive message from business transaction database 414, replication database 416, and shared database 418. In another example, application 206 may send and receive messages from different schemas within each database.

Example messaging system is TIBCO enterprise level messaging system, developed by TIBCO Software Inc. of Palo Alto, Calif.

VBA 400 also includes multiple databases. Applications 206 executing within domains 204 query, access and update data in one or more databases. Example databases within VBA 400 include a profile database 412, business transaction database 414, replication database 416, and shared database 418 for storing data, asset information, STB 104 profiles, STB 104 sets, user profiles, etc.

Profile database 412 includes assets and user profiles. Example assets include, but are not limited to, video-on-demand ("VOD"), shortcuts, commerce platform assets, etc. User profiles include settings and services specific to a user, such as, but are not limited to favorite channels, blocked channels, PIN settings and start channels. In an embodiment, data included in profile database 412 is not associated with any particular STB 104 or another client accessed by a user. Instead, data in profile database 412 may be accessible to any device that a user may choose for receiving application upgrades from VBS 106. For example, network based digital recorder settings for NDVR, NPVR or RS-DVR and preferences of a user that are received on STB 104 may also be received on the mobile device, personal computer, or another device of the user, such as an IPad or an Android device.

Business transaction database 414 includes data related to business transactions. For example, business transaction database 414 stores user-related data such as active rentals and RS-DVR recordings of a user, the serial number of STB 104 associated with a user, account numbers of a user, user home identifiers, etc. In an embodiment, business transaction database 414 may be updated from a replication database 416 whenever a user changes STB 104 or account credentials.

Replication database 416 includes customer information, STB 104 credentials and account information for each user. Replication database 416 replicates customer information, STB 104 credentials and account information included in other databases in VBA 400.

Shared database 418 includes commerce platform assets and commerce platform credentials for VBA 400.

A data collection server 420 is a component within VBA 400 that collects customer usage information. Applications 206 within data collection server 420 may execute on multiple domains 204. Those applications 206 collect customer usage information from STBs 104 or other user devices. Example usage information may include, but is not limited to a video type that the user likes, a channel type the user frequents, a time of day the user receives media content, a profile of a user watching the video, etc. A system administrator may configure applications 206 included in data collection server 420 to collect configurable data from a configurable set of STBs 104. For example, application 206 executing on domain 204 may collect customer usage information for a particular framework or customer usage information for a configured zip code or region.

In an embodiment, VBA 400 may include multiple data collection servers 420 that are load balanced to receive customer usage from multiple frameworks.

Data collection server 420 stores the collected customer usage information in dataset 304 that is associated with a framework. The collected customer usage information may be transmitted to a data collection warehouse 432.

Data collection warehouse 432 stores, aggregates and analyses the collected customer usage information. For example, data collection warehouse 432 performs a statistical analysis of the usage information, generates reports based on customer usage, etc.

A provisional server 422 is another component in VBA 400. Provisional server 422 hosts services which receive requests from STBs 104. For example, provisional server 422 receives a request from STB 104 via messaging system 410. Provisioning server 422 then stores the requests in database, such as the replication database 416. In an embodiment, provisional server 422 may be load balanced among multiple frameworks.

Video streaming system 434 stores media streaming content. Video streaming system 434 includes applications 206 that execute on multiple domains 204. For example, applications 206 executing on one domain 204 may include video content, such as news, whereas applications 206 that execute on another domain may include media content, such as movies. Upon request, STB 104 may gain access to the media content from a particular domain 204 in video streaming system 432.

Application carousel 436 broadcasts data to listening devices or systems, such as publishing system 406. Example data that application carousel 436 broadcasts may be applications 206 that are configured for distribution to STBs 104, computer graphics, images, configuration files, etc.

A Content Management Application ("CMA") System 438 is an external system that provides VOD meta-data, such as VOD artwork, movie asset information, etc. to the components within VBA 400.

Figure 5:
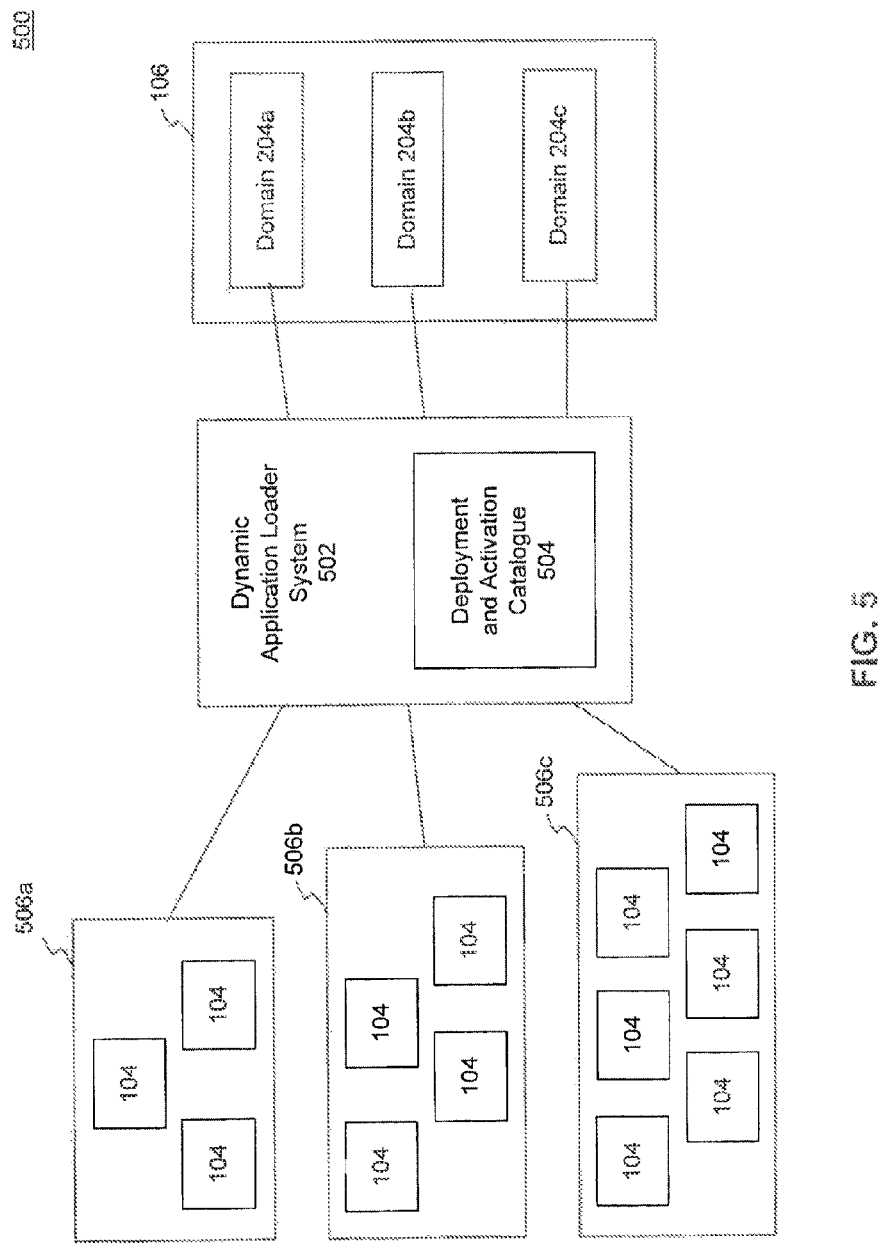
FIG. 5 is a block diagram of an exemplary interface for configuring a set-top-box to access an application from a domain in a virtual backend system.

FIG. 5 is a block diagram 500 of an exemplary interface for configuring an STB to access an application from a domain in VBS. Block diagram 500 includes a dynamic application loader (DAL) system 502. An administrator uses DAL system 502 to configure STBs 104 to interact with a particular domain 204 in VBS 106.

Example VBS 106 in block diagram 500 includes three domains 204, such as domain 204a, domain 204b and domain 204c. Each of domains 204a, 204b and 204c include applications 206. Applications 206 may be different applications across each domain 204 or different versions of the same application 206. Block diagram 500 also includes three groups 506 of STBs 104, such as group 506a, 506b and 506c. DAL system 502 configures STBs 104 within each group 506a-506c to access applications 206 located in the corresponding domain 204a, 204b and 204c. For example, an administrator using DAL system 502 may configure group 506a to access applications 206 located in domain 204a, group 506b to access applications 206 located in domain 204b and group 506c to access applications 206 in domain 204c.

In an embodiment, an administrator may use DAL system 502 to reconfigure (not shown) STBs 104 included in group 204a to access applications 206 in domain 204b or 204c. In yet another embodiment, administrator may use DAL system 502 to reconfigure STBs 104 in groups 506a and 506b into one group 506 (not show) that accesses domain 204a.

A person skilled in the art will appreciate that the configurations above are given by way of example, and not limitation, and that DAL system 502 may configure STBs 104 into multiple groups that access multiple domains 204 in VBS 106.

DAL system 502 includes a deployment and activation catalogue (DAC) 504. DAC 504 stores a list of applications 206 and their supporting components. DAC 504 may be a file, a database table, an application, etc. that stores a listing of applications 206 and the components within VBS 106 that are associated with each application 206. For example, referring to FIG. 4, for each application 206 DAC 504 includes a name of the component (such as data mapping system 402, publishing system 406, virtual data service 408, messaging system 410, etc.) that is associated with application 206, a version of the application, database schemas required in databases 412, 414, 416 and 418 for application 206, STBs 104 that may access application 206, user profile configurations, a framework that uses application 206, external systems that communicate with application 206, etc.

DAC 504 also includes a status check for each component compatible with application 206 within VBS 106. The status check confirms whether each component required by application 206 is configured within the framework in VBS 106. DAC 504 may perform a status check when application 206 is distributed within domains 204 in VBS 106 or accessed by STBs 104.

Using VBA 400 as an example, prior to distributing application 206 within frameworks in VBS 106, a system administrator accesses DAC 504 and determines the version of the component in VBA 400 that is associated with application 206. For example, the system administrator queries the status of each component in VBA 400. When versions of the components in VBA 400 are not compatible with application 206, the status check fails and the system administrator may then configure domain(s) 204, database schemas, islands 302 and/or datasets 304 to be compatible with the failed component. For example, the system administrator may use domain management interface 212 to configure the failed components.

After the system administrator configures components required for application 206, system administrator accesses DAC 504 and performs another status check on the failed component.

When a system administrator completes configuring application 206 for distribution or access, publishing system 406 in VBA 400 may, for example, query DAC 504 and determine whether application 206 may be distributed or accessed. Application 206 may be distributed or accessed when the status check for each component required by application 206 succeeds. In an embodiment, the system administrator may not initiate distribution or access to application 206 unless the status check indicates that each component required for application 206 is properly configured within VBA 400.

When application 206 is being distributed or accessed by STB 104, a system administrator may also verify the compatibility of each STB 104 with application 206. The system administrator may use domain management interface 212 to query a database, such as profile database 412 that includes configuration information, components, and the version of the components that execute on each STB 104. Based on the results obtained by the query, the system administrator determines the compatibility of application 206 with STB 104.

Referring to VBA 400 as an example, publishing system 406 may send a configuration request message to profile database 412. The request message includes a query that queries the profile of each STB 104 that is configured to receive application 206. Profile database 412 uses the query to retrieve the profile for each STB 104 and returns a response message that includes the profiles to publishing system 406. The profiles include components and/or versions of the components that execute on STB 104. Publishing system 406 then performs a status check that determines whether application 206 is compatible with the components included in each STB 104. DAL system 502 may retrieve the results of each status check from publishing system 406 and display to the system administrator whether the status check succeeded or failed for each component in STB 104.

If the status check fails, the system administrator may attempt to re-configure STB 104. In one embodiment, system administrator may attempt to download or upgrade STBs 104 with the components that are compatible with application 206. In another embodiment, the system administrator may determine that a manual STB 104 upgrade is required and have a user who receives media content from VBS 106 obtain a new STB 104. In yet another embodiment, the system administrator may attempt to distribute a different version of application 206 that is compatible with STBs 104.

Publishing system 406 may also send an activation or a de-activation message to STB 104. The activation message indicates to STB 104 that an upgrade process is imminent. The de-activation message indicates to STB 104 that the upgrade process is complete.

Figure 6:
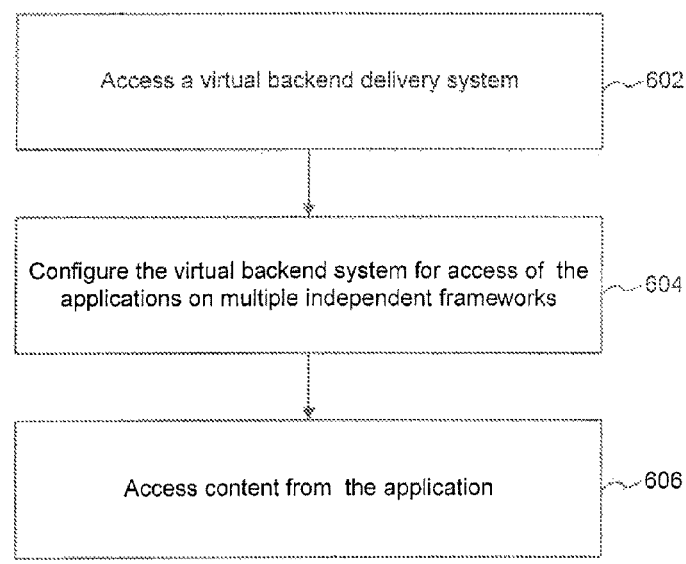
FIG. 6 is a flowchart for a method for using a virtual backend system to distribute applications, according to an embodiment.

FIG. 6 is a flowchart for a method 600 for using a virtual backend system to access applications, according to an embodiment.

At step 602, a virtual backend system is accessed. For example, VBS 106 having an exemplary architecture of VBA 400 is accessed by a system administrator.

Figure 7A:
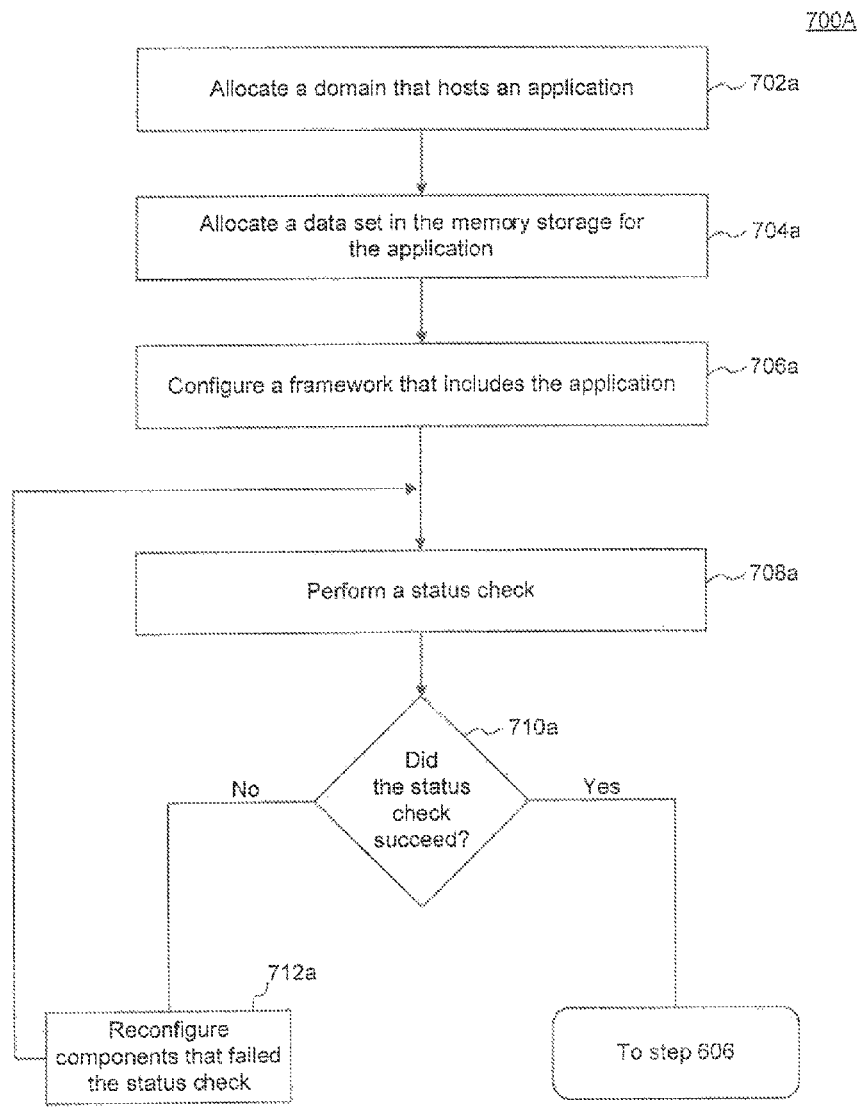
FIG. 7A is a flowchart for a method for configuring the application for distribution to a framework, according to an embodiment.
Figure 7B:
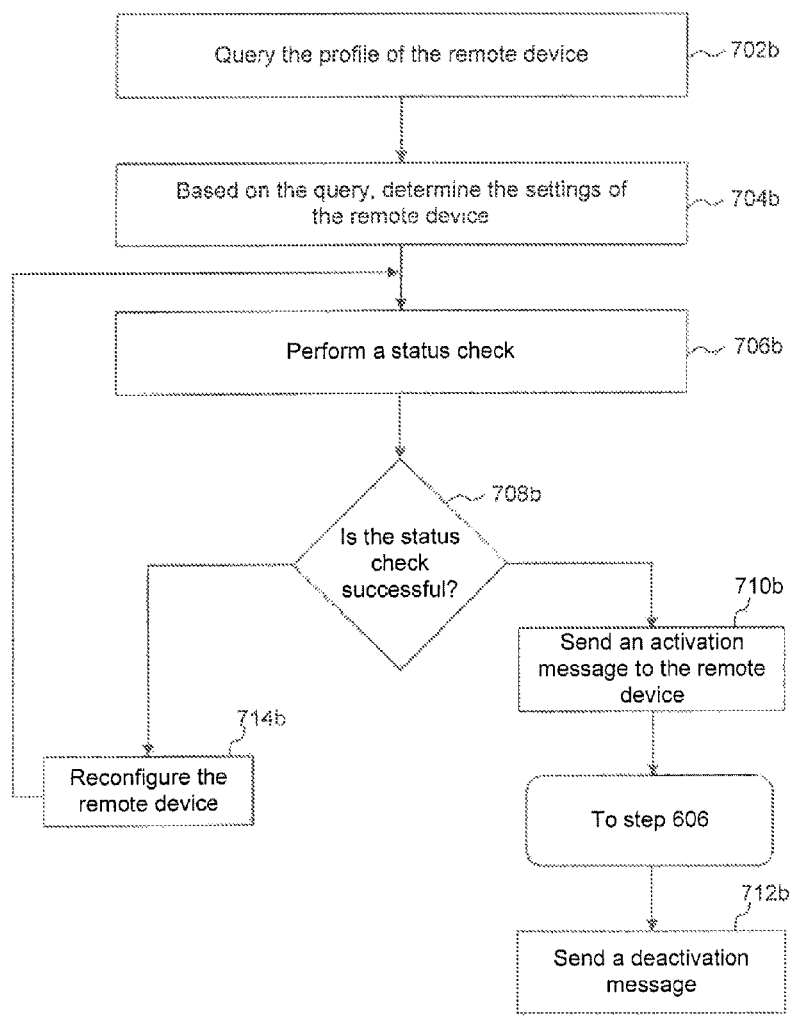
FIG. 7B is a flowchart for a method for configuring an application to a configurable set of remote devices, according to an embodiment.

At step 604, an application is configured for access. For example, DAL 502 configures application 206 for access with other components in VBA 400 or with a configurable set of STBs 104. FIG. 7A is a flowchart 700A for a method for configuring application 206 for access within VBA 400. FIG. 7B is a flowchart 700B for a method for configuring application 206 for access to STBs 104.

At step 606, an application is accessed. For example, application 206 or content from application 206 is accessed by a framework within VBA 400 or by a set of STBs 104.

FIG. 7A is a flowchart 700A for a method for configuring the application for access to a framework. For example, application 206 that requires testing may be distributed to a particular framework, in one embodiment. In another embodiment, a new framework may be configured within VBA 400 to service a configurable set of STBs 104.

At step 702a, a domain for an application is allocated. For example, a system administrator allocates a domain 204 on server 202 that hosts application 206. Domain 202 is included in a framework that includes components compatible with application 206.

At step 704a, memory is allocated for data processed by an application. For example, system administrator creates dataset 304 on island 302 in memory storage 214. As described herein, dataset 304 may be local dataset 304A, global dataset 304B or hybrid dataset 304C.

At step 706a, a framework is configured. The framework is configured from the components compatible with application 206. A system administrator may configure a framework from a list stored in a DAC that includes a listing of the compatible components for each application 206. As described herein, each framework within VBA 400 is independent of other frameworks. This configuration allows VBA 400 to include multiple independent frameworks to service a configurable set of STBs 104, implement QA and testing environments, etc.

At step 708a, a status check is performed. For example, system administrator queries a DAC for a list of applications that are compatible with application 206. Once the system administrator obtains the DAC list for application 206, the system administrator performs a compatibility check that determines whether application 206 is compatible with the components within the framework.

At step 710a, a determination is made as to whether the status check was successful. A successful status check indicates compatibility between application 206 and the associated components within the framework. If the status check is successful, flowchart 700A proceeds to step 706. Otherwise, flowchart 700A proceeds to step 712a.

At step 712a, a component that failed the status check is installed or reconfigured. For example, a system administrator installs or upgrades a component within the framework that is not compatible with VBA 400. After the component is installed or upgraded, the flowchart proceeds to step 708a, described herein.

FIG. 7B is a flowchart 700B for a method for configuring an application for distribution to a configurable set of remote devices. For example, after a system administrator configures the framework in FIG. 7, an administrator may decide to access application 206 to a set of STBs 104 that is associated with the framework.

At step 702b, a profile of a set of STBs is queried. For example, a system administrator queries profiles of each STB 104 in the set of STBs 104 that is configured to receive application 206. System administrator may use domain management interface 212 to query the profile of each STB 104. In an embodiment, system administrator queries profile database 412 for a profile of each STB 104.

At step 704b, the profile of each STB is determined. For example, profile database 412 returns the profile of each STB 104 to the system administrator, as described herein.

At step 706b, a status check is performed. For example, domain management interface 212 determines whether the profile of each STB 104 is compatible with application 206.

At step 708b, a determination is made as to whether the status check was successful. A successful status check indicates compatibility between application 206 and each STB 104. If the status check is successful, flowchart 700B proceeds to step 710b. Otherwise, flowchart 700B proceeds to step 714b.

At step 710b, an activation message is received. For example, each STB 104 in the set of STBs 104 receives an activation message from VBS 106. The activation message prepares each STB 104 to receive application 206. After the activation message is received, the flowchart proceeds to step 706.

After the distribution of application 206 is completed at step 706, the flowchart may proceed to step 712b. At step 712b, STB 104 receives a deactivation message. For example, STB 104 receives a deactivation message from VBS 106 that indicates that the upgrade is complete.

At step 714b, a component that failed a status check is upgraded or reconfigured. For example, a system administrator may attempt to install or upgrade a component on STB 104 that is incompatible with application 206. In another embodiment, a new STB 104 that includes the required component may be issued to a user who is receiving media content. After the upgrade, the flowchart proceeds to step 706b.

Figure 8:
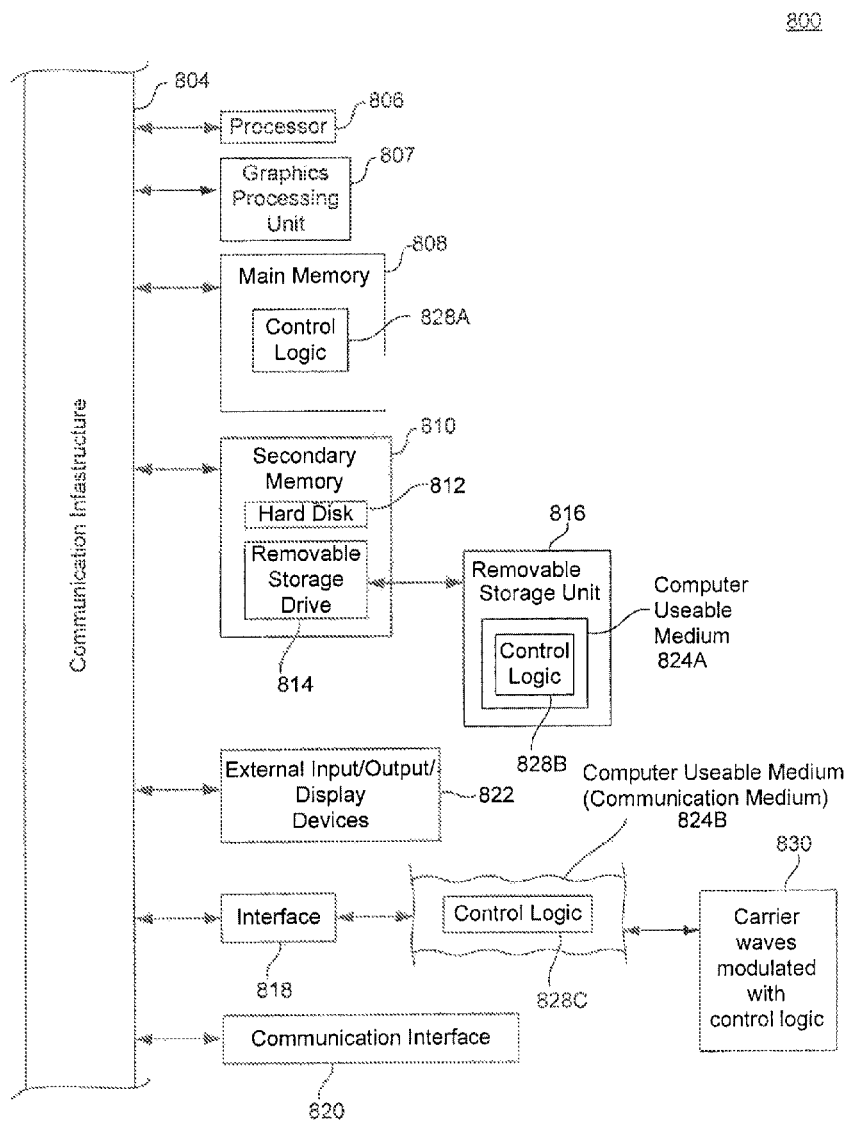
FIG. 8 is a block diagram of a computing environment where the embodiments of the invention may be implemented.

FIG. 8 is a schematic diagram of an example computer system 800 used to implement embodiments of STB 104 and/or VBS 106. Various aspects of the various embodiments can be implemented by software, firmware, hardware, or a combination thereof. Example computer system 800 in which an embodiment, or portions thereof, can also be implemented as computer-readable code. After reading this description, it will become apparent to a person skilled in the relevant art how to implement embodiments using other computer systems and/or computer architectures.

Computer system 800 includes one or more processors, such as processor 806. Processor 806 can be a special purpose or a general purpose processor. Processor 806 is connected to a communication infrastructure 806 (for example, a bus or network).

Computer system 800 also includes one or more graphics processing units, such as graphics processing unit ("GPU") 807. GPU 807 is also connected to a communication infrastructure 806. GPU 807 is a specialized processor that executes instructions and programs, selected for complex graphics and mathematical operations, in parallel. For example, GPU 807 may be adept at displaying and processing streaming media content.

Computer system 800 also includes a main memory 808, preferably random access memory (RAM), and may also include a secondary memory 810. Secondary memory 810 may include, for example, a hard disk drive 812 and/or a removable storage drive 814. Removable storage drive 814 may comprise a floppy disk drive, a magnetic tape drive, an optical disk drive, a flash memory, or the like. The removable storage drive 814 reads from and/or writes to a removable storage unit 816 in a well-known manner. Removable storage unit 816 may comprise a floppy disk, magnetic tape, optical disk, etc. which is read by and written to by removable storage drive 814. As will be appreciated by persons skilled in the relevant art(s), removable storage unit 816 includes a tangible computer readable storage medium 824A having stored therein control logic 828B such as computer software and/or data.

In alternative implementations, secondary memory 810 may include other similar means for allowing computer programs or other instructions to be loaded into computer system 800. Such means may include, for example, a removable storage unit 816 and an interface 818. Examples of such means may include a program cartridge and cartridge interface (such as that found in video game devices), a removable memory chip (such as an EPROM, or PROM) and associated socket, and other removable storage units 816 and interfaces 818 which allow software and data to be transferred from the removable storage unit 816 to computer system 800. As will be appreciated by persons skilled in the relevant art(s), interface 818 also includes a tangible computer readable storage medium 824B having stored therein control logic 828C such as computer software and/or data.

Computer system 800 may also include a communications interface 820. Communications interface 820 allows software and data to be transferred between computer system 800 and external devices 822. Communications interface 820 may include a modem, a network interface (e.g., an Ethernet card), a communications port, a PCMCIA slot and card, or the like. Software and data transferred via communications interface 820 are provided to communications interface 820 via a communications path. Communications path may be implemented using wire or cable, fiber optics, a phone line, a cellular phone link, a radio frequency (RF) link or other communications channels.

In this document, the terms "computer program medium" and "computer usable medium" are used to generally refer to media such as removable storage unit 816 and a hard disk 812 installed in hard disk drive 812. Computer program medium and computer usable medium can also refer to memories, such as main memory 808 and secondary memory 810, which can be memory semiconductors (e.g. DRAMs, etc.). These computer program products are means for providing software to computer system 800.

Computer programs (also called computer control logic 828) are stored in main memory 808, such as control logic 828A and/or secondary memory 810, such as control logic 828B. Computer programs may also be received via interface 818, such as control logic 828C. Such computer programs, when executed, enable computer system 800 to implement embodiments as discussed herein, such as the system described above. In particular, the computer programs, when executed, enable processor 806 to implement the processes of embodiments. Accordingly, such computer programs represent controllers of the computer system 800. Where embodiments are implemented using software, the software may be stored in a computer program product and loaded into computer system 800 using removable storage drive 814, interface 818, hard drive 812 or communications interface 822.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor, and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for distributing content using a virtual backend service (VBS) platform, comprising:

hosting a plurality of independent frameworks on the VBS platform, wherein a first independent framework from the plurality of frameworks includes resources for an application that provides a service over a network independent of a second independent framework;

configuring the first independent framework in the VBS platform for the application such that the resources within the first independent framework are compatible with the application;

configuring access to the first independent framework by a set of computing devices, wherein the configuring dynamically switches access of a computing device in the set of computing devices to the first independent framework from the second independent framework; and distributing the application to the set of computing devices, whereby the resources of the first independent framework are accessed by the application executing on the computing device.

2. The computer-implemented method of claim 1, wherein the service includes content.

3. The computer-implemented method of claim 2, wherein the service includes media content or streaming content.

4. The computer-implemented method of claim 1, wherein the computing device is a set-top box (STB).

5. The computer-implemented method of claim 1, wherein the first independent framework provides a publishing service to the application on the computing device.

6. The computer-implemented method of claim 1, wherein the first independent framework provides a messaging service to the application on the computing device.

7. The computer-implemented method of claim 1, further comprising:
performing a compatibility check within the first independent framework, wherein the compatibility check verifies that the resources within the first independent framework are compatible with the application;
if the compatibility check fails, using the VBS platform to upgrade a failed resource in the first independent framework.

8. The computer-implemented method of claim 1, further comprising:
performing a compatibility check of the set of computing devices, wherein the compatibility check verifies that resources on a verified computing device are compatible with the application;
if the compatibility check fails, upgrading, using the VBS platform, a failed resource on the verified computing device.

9. The computer-implemented method of claim 8, wherein performing the compatibility check further comprises:
scanning a plurality of profiles of the set of computing devices within a memory storage of the VBS platform, wherein a profile includes a listing of the resources included in the verified computing device.

10. The computer-implemented method of claim 8, wherein the upgrading, using the VBS platform, further comprises:
downloading a new version of the failed resource to the computing device.

11. A system for distributing content, comprising:
a virtual backend service (VBS) platform stored in one or more memories and configured to execute on one or more processors and configured to:
host a plurality of independent frameworks on the VBS platform, wherein a first independent framework from the plurality of frameworks includes resources stored in the one or more memories and the resources are for an application that provides a service over a network independent of a second independent framework;
configure, using the one or more processors, the first independent framework in the VBS platform for the application such that the resources within the first independent framework are compatible with the application;
configure access to the first independent framework by a set of computing devices, wherein the configuring dynamically switches access of a computing device in the set of computing devices to the first independent framework from the second independent framework; and
distribute the application to the set of computing devices, whereby the resources of the first independent framework are accessed by the application executing on the computing device.

12. The system of claim 11, wherein the service includes content.

13. The system of claim 12, wherein the service includes media content or streaming content.

14. The system of claim 11, wherein the computing device is a set-top box (STB).

15. The system of claim 11, wherein the first independent framework provides a publishing service to the application on the computing device.

16. The system of claim 11, wherein the first independent framework provides a messaging service to the application on the computing device.

17. The system of claim 11, wherein the VBS is further configured to:
perform a compatibility check within the first independent framework, wherein the compatibility check verifies that the resources within the first independent framework are compatible with the application;
if the compatibility check fails, use the VBS platform to upgrade a failed resource in the first independent framework.

18. The system of claim 11, wherein the VBS is further configured to:
perform a compatibility check of the set of computing devices, wherein the compatibility check verifies that resources on a verified computing device are compatible with the application;
if the compatibility check fails, upgrading, using the VBS platform, a failed resource on the verified computing device.

19. The system of claim 18, wherein to perform the compatibility check, the VBS is further configured to:
scan a plurality of profiles of the set of computing devices within a memory storage of the VBS platform, wherein a profile includes a listing of the resources included in the verified computing device.

20. A tangible computer-readable device having instructions stored thereon that, when executed by a virtual backend service (VBS) platform, causes the VBS platform to distribute content by performing operations comprising:
hosting a plurality of independent frameworks on the VBS platform, wherein a first independent framework from the plurality of frameworks includes resources for an application that provides a service over a network independent of a second independent framework;
configuring the first independent framework in the VBS platform for the application such that the resources within the first independent framework are compatible with the application;
configuring access to the first independent framework by a set of computing devices, wherein the configuring dynamically switches access of a computing device in the set of computing devices to the first independent framework from the second independent framework; and
distributing the application to the set of computing devices, whereby the resources of the first independent framework are accessed by the application executing on the computing device.

* * * * *